United States Patent
Paulson et al.

(10) Patent No.: US 7,801,184 B2
(45) Date of Patent: Sep. 21, 2010

(54) ADAPTIVE METHOD FOR TRAINING A SOURCE SYNCHRONOUS PARALLEL RECEIVER

(75) Inventors: Christopher D. Paulson, Fort Collins, CO (US); Timothy D. Thompson, Windsor, CO (US); Kevin T. Campbell, Windsor, CO (US)

(73) Assignee: LSI Corporation, Milpitas, CA (US)

( * ) Notice: Subject to any disclaimer, the term of this patent is extended or adjusted under 35 U.S.C. 154(b) by 1026 days.

(21) Appl. No.: 11/141,795

(22) Filed: May 31, 2005

(65) Prior Publication Data
US 2006/0268941 A1 Nov. 30, 2006

(51) Int. Cl.
H04J 3/06 (2006.01)
(52) U.S. Cl. .................. 370/510; 370/514; 370/516
(58) Field of Classification Search ......... 370/508–512, 370/514, 241–253, 503, 516–518; 375/354, 375/368; 714/731
See application file for complete search history.

(56) References Cited

U.S. PATENT DOCUMENTS

2003/0095575 A1 * 5/2003 Annadurai et al. .......... 370/516
2003/0196132 A1 * 10/2003 Chiang ....................... 713/503

* cited by examiner

*Primary Examiner*—Seema S Rao
*Assistant Examiner*—Jianye Wu
(74) *Attorney, Agent, or Firm*—Christopher P. Whitham; Cochran Freund & Young LLC

(57) ABSTRACT

Disclosed is an adaptive method for training a source synchronous parallel receiver. The adaptive method for training, or aligning, parallel data channels permits a parallel communication receiver to adaptively adjust the timing of data channels to align the data channels with a frame channel and achieve a source synchronous signal for the parallel data channels. Further, portions of the frame channel training pattern may be used because possible time shift accuracy error is accounted for between the communication channels and a determination is made as to which portion of the frame pattern is currently being received. The data channels are then aligned appropriately.

13 Claims, 5 Drawing Sheets

300 RAPIDIO TRAINING PATTERNS

FIGURE 5

ADAPTIVE METHOD FOR TRAINING A SOURCE SYNCHRONOUS PARALLEL RECEIVER

BACKGROUND OF THE INVENTION a. Field of the Invention

The present invention generally pertains to electronic communications and more particularly to electronic parallel data communications.

b. Description of the Background

There are two standard communication models for electronic communications, serial and parallel. Serial communications send all data along a single communications channel. For a digital signal, a serial connection is decoded by setting a clock speed for the signal and sampling the communication at each clock tick. Each sample is set to a 1 or 0 based on whether the sampled signal was high or low. The receiving system then blocks out the data received into frames of a specified number of data bits. Often the number of data bits in a frame is set to 8 bits (or a byte) with possible additional bits for parity and/or stop status indicators.

A parallel communication connection is essentially a group of serial communication channels operating together to provide faster data throughput than is possible with a single serial connection. Parallel communication connections typically consist of a power of two (i.e., 2, 4, 8, 16, and so on) data channels operating synchronously to provide data communications. Eight data channels is a common number of parallel data channels since eight data channels provides data in even byte increments. A parallel communication connection may work similar to a serial connection by sampling all data channels at a specific clock speed and then putting the sampled data together according to the appropriate communication protocol. A parallel communication connection may also include a frame communication channel that permits a receiver to coordinate the data channels if there is any possibility that the data channels may have slightly different transmit times for each individual physical communication channel. A communications channel may be any physical communication channel including a wire, a printed circuit board trace, or a fiber optic link. As communication speeds have increased, the use of a frame channel within a parallel communication connection has become more common. RapidIO, InfiniBand, Advanced Switching Interconnect (ASI), and System Packet Interface (SPI) are examples of modern parallel communication protocols that employ a frame communication channel in addition to multiple parallel data communication channels.

Information on the RapidIO specification is kept by the RapidIO Trade Association, 3925 W. Braker Lane, Suite 325, Austin, Tex. 78759, telephone number 512-305-0070, and web site www.rapidio.org. RapidIO is a registered trademark of the RapidIO Trade Association.

Information on the InfiniBand specification is kept by the InfinBand Trade Association, 5440 SW Westgate Drive, Suite 217, Portland, Oreg. 97221, telephone number 503-291-2565, and web site www.infinibandta.org. InfiniBand is a registered trademark of System I/O, Inc., doing business as InfiniBand Trade Association.

Information on the Advanced Switching Interconnect (ASI) specification is kept by the Advanced Switching Interconnect SIG, c/o VTM, 5440 SW Westgate Drive, Suite 217, Portland, Oreg. 97221, telephone number 503-291-2566, and web site www.infinibandta.org.

Information on the System Packet Interface (SPI) specification is kept by the Optical Internetworking Forum, 39355 California Street, Suite 307, Fremont, Calif. 94538, telephone number 510-608-5928.

SUMMARY OF THE INVENTION

An embodiment of the present invention may therefore comprise a method for training parallel digital communications signals comprising the steps of: receiving a frame communication signal from a transmitter, the transmitter communicating according to a standard communication protocol, the frame communication signal repeating a frame channel training pattern as specified in the standard communication protocol; receiving multiple data communication signals from the transmitter, the data communication signals repeating a data channel training pattern as specified in the standard communication protocol; comparing each of the data communication signals to the frame communication signal to obtain a data to frame signal relationship; determining a time shift reference relationship between each of the data communication signals and the frame communication signal by comparing the data to frame signal relationship of each of the data communication signals to a training pattern relationship between the frame channel training pattern and the data channel training pattern as specified in the standard communication protocol, and adjusting the data to frame signal relationship to account for a known maximum bit timing error between each of the data communication signals and the frame communication signal; and aligning each of the data communication signals to the frame communication signal by shifting each of the data communication signals to eliminate the time shift reference relationship.

An embodiment of the present invention may further comprise a parallel digital communications receiver device comprising: a frame channel input that receives a frame communication signal from a transmitter, the transmitter communicating according to a standard communication protocol, the frame communication signal repeating a frame channel training pattern as specified in the standard communication protocol; multiple data channel inputs that receive multiple data communication signals from the transmitter, the data communication signals repeating a data channel training pattern as specified in the standard communication protocol; a comparison subsystem that compares each of the data communication signals to the frame communication signal to obtain a data to frame signal relationship; a time shift reference subsystem that determines a time shift reference relationship between each of the data communication signals and the frame communication signal by comparing the data to frame signal relationship of each of the data communication signals to a training pattern relationship between the frame channel training pattern and the data channel training pattern as specified in the standard communication protocol, and adjusts the data to frame signal relationship to account for a known maximum bit timing error between each of the data communication signals and the frame communication signal; and an alignment subsystem that aligns each of the data communication signals to the frame communication signal by shifting each of the data communication signals to eliminate the time shift reference relationship.

An embodiment of the present invention may further comprise a parallel digital communications receiver device comprising: means for receiving a frame communication signal from a transmitter, the transmitter communicating according to a standard communication protocol, the frame communication signal repeating a frame channel training pattern as specified in the standard communication protocol; means for receiving multiple data communication signals from the transmitter, the data communication signals repeating a data channel training pattern as specified in the standard communication protocol; means for comparing each of the data communication signals to the frame communication signal to obtain a data to frame signal relationship; means for determining a time shift reference relationship between each of the data communication signals and the frame communication signal; and means for aligning each of the data communication signals to the frame communication signal.

DETAILED DESCRIPTION OF THE INVENTION

Figure 1:
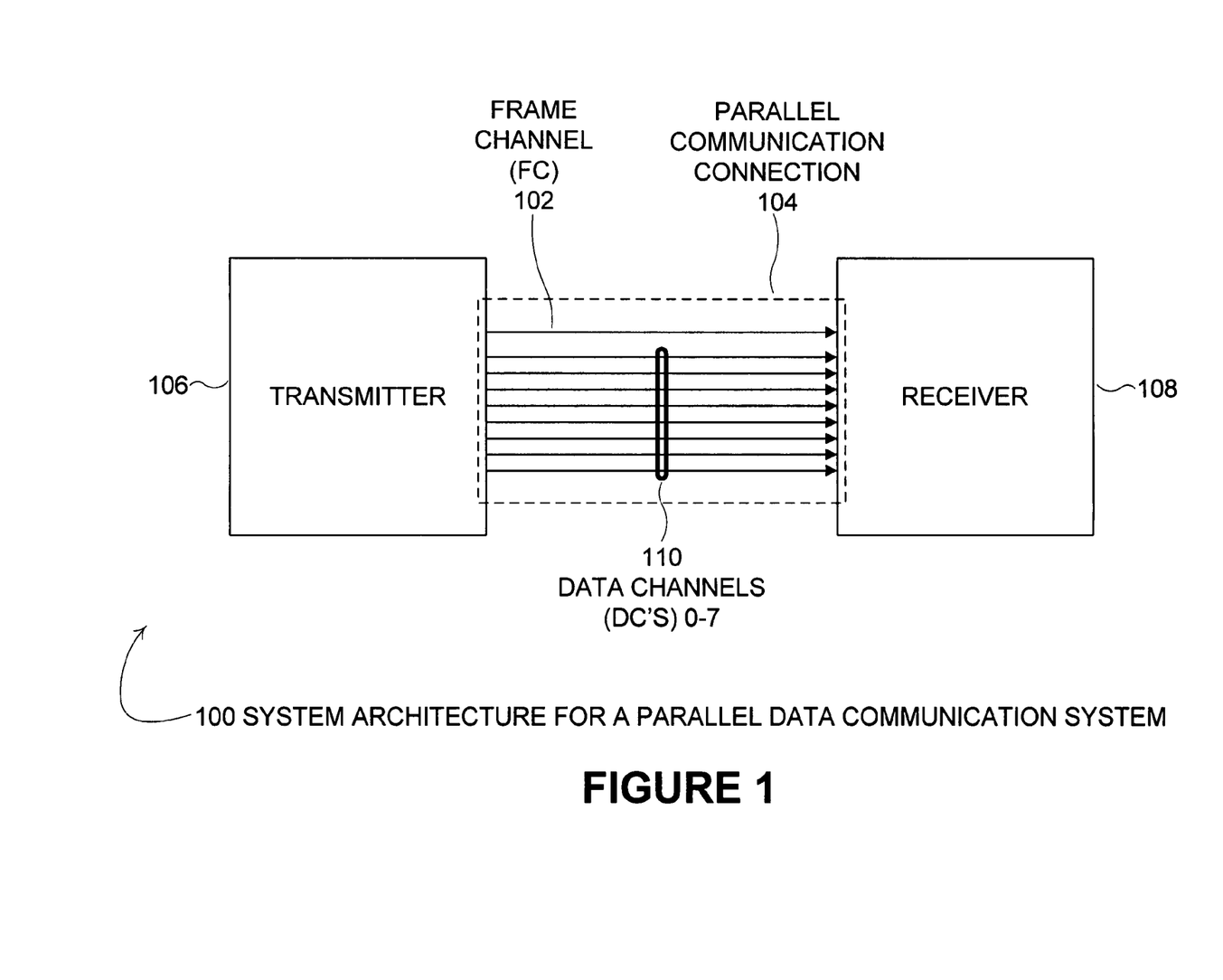
FIG. 1 is a schematic illustration of the system architecture for a parallel data communication system.

FIG. 1 is a schematic illustration (100) of the system architecture for a parallel data communication system. As shown in the embodiment of FIG. 1, a system may comprise a transmitter (106) connected via the parallel communication connection (104) to a receiver (108). The physical medium of each channel of the parallel communication connection (104) may be any physical medium used for electronic communications, including: a wire, a printed circuit board trace, or a fiber optic link.

The parallel communication connection (104) shown consists of a Frame Channel (FC) (102) and eight Data Channels (DC's) (110). A parallel communication connection 104 may consist of any number of data channels (110), but the number of data channels is typically a power of two, that is, 2, 4, 8, 16, and so on. Eight data channels (110) is common because using eight channels allows data to be sent in byte size (8 bit) pieces. The frame channel (102) is used to assist in coordinating the data channels (110). It is possible to rely on a clock to determine the sampling and coordination of the data channels (110) without the need for a frame channel (102), but the higher the speed and the shorter the length of a given bit signal, the more likely it will be necessary to have the frame channel (102). Modern parallel communication protocols such as RapidIO, InfiniBand, Advanced Switching Interconnect (ASI), and System Packet Interface (SPI) utilize a frame channel (102) to assist in coordinating the data channels (110). In the new high speed systems, the propagation delay on the wire can take long enough that more than one bit signal appears on the wire at the same time. That is, the communication speed is actually so fast that it is possible for the receiver to be transmitting the next bit while the receiver is still receiving the prior bit. With communication speed at a premium, the bit signal is shortened as much as possible and depending on clock timing alone to coordinate the data signals (110) becomes impractical. The frame channel (102) combined with the communication protocol standards permit the receiver to coordinate the data channels (110).

Figure 2:
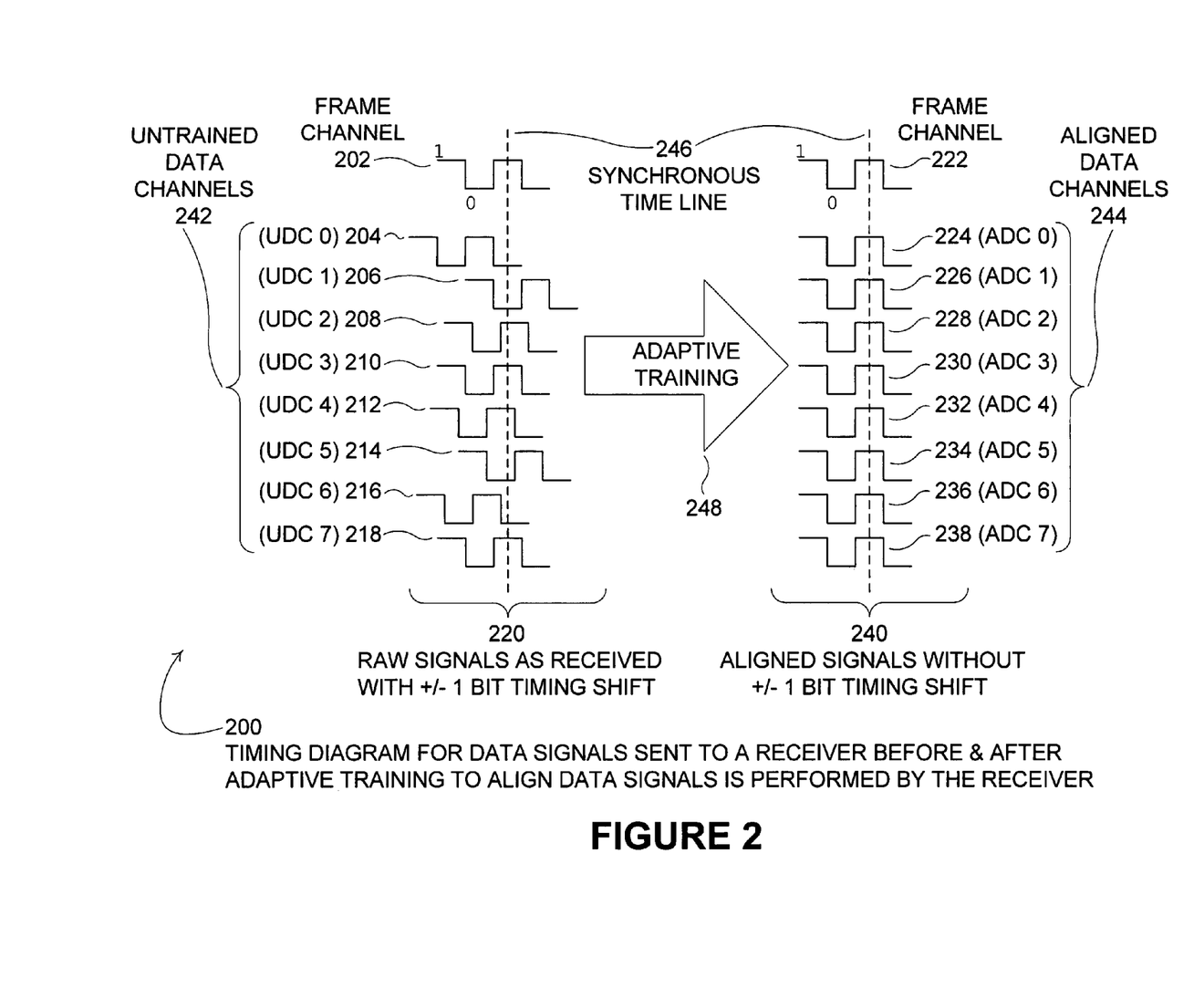
FIG. 2 is a timing diagram for data signals sent to a receiver before and after adaptive training to align the data signals is performed by the receiver.

FIG. 2 is a timing diagram (200) for data signals sent to a receiver before (220) and after (240) adaptive training to align the data signals is performed by the receiver. To make understanding the timing diagrams (220, 240) easier, all signals consist of a simple stream of 1, 0 toggle repetitions. The timing diagrams show only the portion of the signals that are desired to be coordinated and aligned to the frame channel (202, 222). The untrained data channels (242) may be off by +/−1 bit. The propagation differences between the physical communication channels of the individual data channel connections (204, 206, 208, 210, 212, 214, 216, 218) can result in a difference of +/−1 bit between each data channel (242) and the frame channel (202). Using the first full '1' data value of the communication signals as the desired synchronous time line (246), the adaptive training algorithm (248) of the parallel receiver adjusts the untrained data channel signals (242) such that all of the data channels (244) are aligned to the frame channel (222).

Each of the untrained data channels (242) must be adjusted by the adaptive training (248) of the receiver to align to the synchronous time line of the frame channel (202). Untrained data channel 0 (204) is approximately 1 bit behind the frame channel (202). The adaptive training (248) synchronizes untrained data channel 0 (204) by adjusting the overall system signal such that the aligned data channel 0 (224) is aligned with the frame channel (222). The other untrained data channels (242) are similarly adjusted to become aligned data channels (244) that are synchronous with the frame channel (222). Untrained data channel 1 (206) is 1 bit ahead of the frame channel (202) and is adjusted to become aligned data channel 1 (226). Untrained data channel 2 (208) is slightly ahead of the frame channel (202) and is adjusted to become aligned data channel 2 (228). Untrained data channel 3 (210) is roughly synchronized with the frame channel (202) and little adjustment is necessary to become aligned data channel 3 (230). Untrained data channel 4 (212) is slightly behind the frame channel (202) and is adjusted to become aligned data channel 3 (232). Untrained data channel 5 (214) is almost 1 bit Untrained data channel 6 (216) is almost 1 bit behind the frame channel (202) and is adjusted to become aligned data channel 6 (236). Untrained data channel 7 (208) is roughly synchronized with the frame channel (202) and little adjustment is necessary to become aligned data channel 7 (238).

Figure 3:
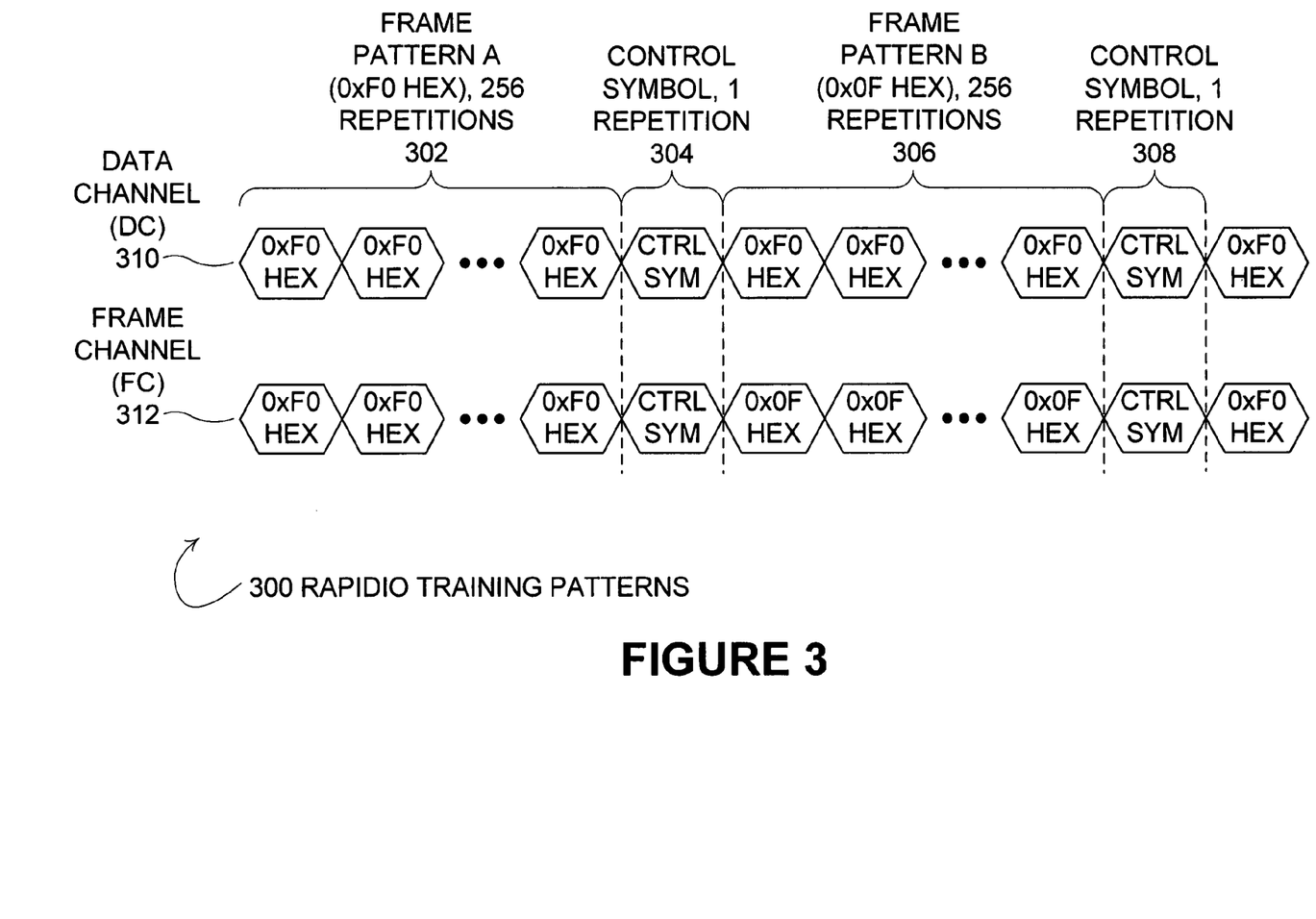
FIG. 3 is a schematic illustration of 8-bit RapidIO training patterns.

FIG. 3 is a schematic illustration (300) of 8-bit RapidIO training patterns. The data frame for communications on any channel of the RapidIO system shown is 8-bits. The data frame for a channel can be any size, but as with the number of channels, 8 bits is convenient since 8 bits make up a byte. The training pattern for the frame channel (312) consists of 256 instances of 0xF0 hex data frames (302), followed by a single instance of a control symbol data frame (304), followed by 256 instances of 0x0F hex data frames (306), and finished with a single instance of a control symbol data frame (308). The frame channel (312) training pattern is repeated until the training process is complete, thus, the overall pattern for the frame channel (312) toggles between 256 instances of 0xF0 hex data frames (302) and 256 instances of 0x0F data frames (306) separated by a single instance of a control symbol data frame (304, 308). In the present document, the 256 frame channel instances of 0xF0 hex data frames (302) are designated 'Frame Pattern A' (302) and the 256 frame channel instances of 0x0F data frames (306) are designated 'Frame Pattern B' (306).

For the RapidIO system shown, each data channel (310) has a training pattern consisting of 256 repetitions of a 0xF0 hex data frames (302), followed by a single instance of a control symbol data frame (304), followed by another 256 repetitions of 0×F0 hex data frames (306), and finished with a single instance of a control symbol data frame (308). The training pattern for a data channel (310) does not toggle, the data channel training pattern (310) is simply 256 instances of 0×F0 data frames separated by a single control symbol data frame (304, 308) and repeated until the training process is complete. Note that 0×F0 hex is '11110000' in binary and that 0×0F hex is '00001111' in binary.

The training pattern shown (300) is for an 8-bit embodiment of a RapidIO parallel communication system. It is possible to have another embodiment of a RapidIO system with a different number of bits, but with a similar training pattern adjusted to account for the different number of bits in the embodiment. Other parallel communication protocols work with similar concepts of training channels, but the data values of frames and the number of repetitions between control symbols may not be the same as the RapidIO system shown. It is also possible to have more than the two data frame values shown, frame pattern A (302) and frame pattern B (306). Basically, the repetitions and values are not as important as having a standard, repeatable training pattern that has a defined correlation between the data channel training pattern (310) and the frame channel training pattern (312).

Figure 4A:
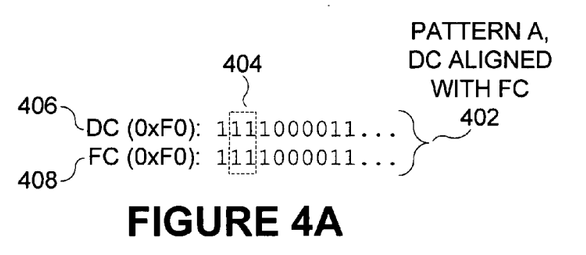
FIGS. 4A-F are illustrations of the possible Data Channel (DC) to Frame Channel (FC) timing shifts for an 8-bit RapidIO system that has a timing accuracy of +/−1 bit.

FIGS. 4A-F are illustrations (400) of the possible Data Channel (DC) to Frame Channel (FC) timing shifts for an 8-bit RapidIO system that has a timing accuracy of +/−1 bit. FIG. 4A shows the bit correlation (402) between a data channel (406) and the frame channel (408) when the frame channel (408) is receiving 0×F0 hex data frames (frame channel training pattern A data). The data channel (406) and the frame channel (408) are aligned (402) without any timing shift of the bits between the two channels (406, 408). Knowing that there is a maximum of a 1 bit error, the receiver is able to inspect the middle two 1 bits (404) of both channels (406, 408) and see that the value (404) for both channels (406, 408) are equal. Since both channels (406, 408) are equal (404), the receiver is able to determine that the frame channel (408) is functioning in frame training pattern A, and then perform the alignment training calculations accordingly.

Figure 4B:
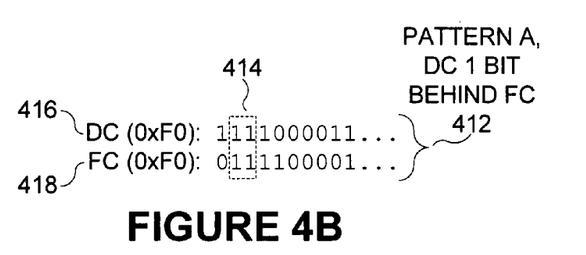

FIG. 4B shows the bit correlation (412) between a data channel (416) and the frame channel (418) when the frame channel (418) is receiving 0×F0 hex data frames (frame channel training pattern A data). The data channel (416) is 1 bit behind the frame channel (418). Knowing that there is a maximum of a 1 bit error, the receiver is able to inspect the middle two 1 bits (414) of both channels (416, 418) and see that the value (414) for both channels (416, 418) are equal. Since both channels (416, 418) are equal (414), the receiver is able to determine that the frame channel (418) is functioning in frame training pattern A despite the fact that the data channel (416) is 1 bit behind the frame channel (418). Knowing that the frame channel (418) is functioning in frame training pattern A, the receiver is able to align the data channel (416) to the frame channel (418) by programmatically removing the 1 bit timing accuracy error.

Figure 4C:
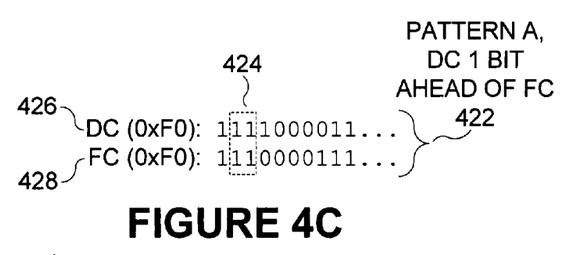

FIG. 4C shows the bit correlation (422) between a data channel (426) and the frame channel (428) when the frame channel (428) is receiving 0×F0 hex data frames (frame channel training pattern A data). The data channel (426) is 1 bit ahead of the frame channel (428). Knowing that there is a maximum of a 1 bit error, the receiver is able to inspect the middle two 1 bits (424) of both channels (426, 428) and see that the value (424) for both channels (426, 428) are equal. Since both channels (426, 428) are equal (424), the receiver is able to determine that the frame channel (428) is functioning in frame training pattern A despite the fact that the data channel (426) is 1 bit ahead of the frame channel (428). Knowing that the frame channel (428) is functioning in frame training pattern A, the receiver is able to align the data channel (426) to the frame channel (428) by programmatically removing the 1 bit timing accuracy error.

Figure 4D:
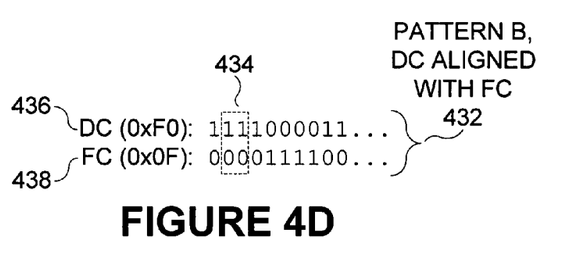

FIG. 4D shows the bit correlation (432) between a data channel (436) and the frame channel (438) when the frame channel (438) is receiving 0×0F hex data frames (frame channel training pattern B data). The data channel (436) and the frame channel (438) are aligned (432) without any timing shift of the bits between the two channels (436, 438). Knowing that there is a maximum of a 1 bit error, the receiver is able to inspect the middle two 1 bits (434) of the data channel (436) and see that the corresponding middle two bits (434) of the frame channel (438) are 0 bits. Since the two channels (436, 438) have opposite values (434), the receiver is able to determine that the frame channel (438) is functioning in frame training pattern B, and then perform the alignment training calculations accordingly.

Figure 4E:
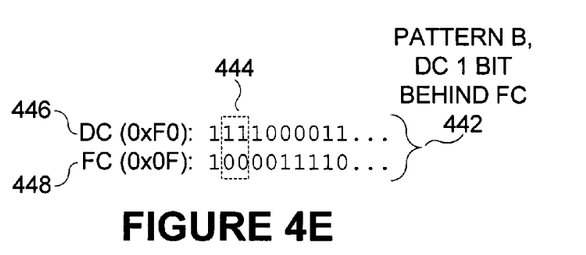

FIG. 4E shows the bit correlation (442) between a data channel (446) and the frame channel (448) when the frame channel (448) is receiving 0×0F hex data frames (frame channel training pattern B data). The data channel (446) is 1 bit behind the frame channel (448). Knowing that there is a maximum of a 1 bit error, the receiver is able to inspect the middle two 1 bits (444) of the data channel (446) and see that the corresponding middle two bits (444) of the frame channel (448) are 0 bits. Since the two channels (446, 448) have opposite values (444), the receiver is able to determine that the frame channel (448) is functioning in frame training pattern B despite the fact that the data channel (446) is 1 bit behind the frame channel (448). Knowing that the frame channel (448) is functioning in frame training pattern B, the receiver is able to align the data channel (446) to the frame channel (448) by programmatically removing the 1 bit timing accuracy error.

Figure 4F:
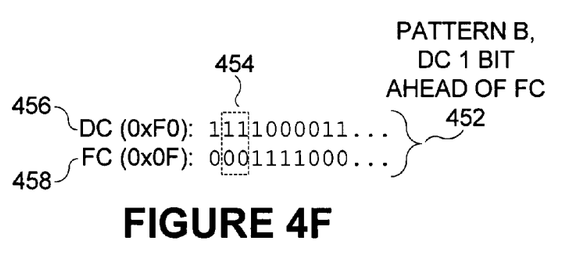

FIG. 4F shows the bit correlation (452) between a data channel (456) and the frame channel (458) when the frame channel (458) is receiving 0×0F hex data frames (frame channel training pattern B data). The data channel (456) is 1 bit ahead of the frame channel (458). Knowing that there is a maximum of a 1 bit error, the receiver is able to inspect the middle two 1 bits (454) of the data channel (456) and see that the corresponding middle two bits (454) of the frame channel (458) are 0 bits. Since the two channels (456, 458) have opposite values (454), the receiver is able to determine that the frame channel (458) is functioning in frame training pattern B despite the fact that the data channel (456) is 1 bit ahead of the frame channel (458). Knowing that the frame channel (458) is functioning in frame training pattern B, the receiver is able to align the data channel (456) to the frame channel (458) by programmatically removing the 1 bit timing accuracy error.

There is a similar relationship of the data channel (406, 416, 426, 436, 446, 456) middle two 0 bits and the frame channel (408, 418, 428, 438, 448, 458) as there is between the data channel (406, 416, 426, 436, 446, 456) middle two 1 bits (404, 414, 424, 434, 444, 454) and the frame channel (408, 418, 428, 438, 448, 458). Therefore, it is possible to use the middle two 0 bits for comparison rather than the middle two 1 bits (404, 414, 424, 434, 444, 454).

A RapidIO system utilizing a different number of bits would have similar training patterns and relationships between the data channel training pattern, the frame channel training pattern, and the known maximum bit timing accuracy error as the 8-bit RapidIO system of FIGS. 4A-F. Also, any other high speed parallel protocol, such as RapidIO, Infini-Band, Advanced Switching Interconnect (ASI), and System Packet Interface (SPI), will have training patterns for the data channels and the frame channel that can establish a relationship between the data channel, the frame channel, and the known maximum bit timing accuracy error similar to the relationship shown in FIGS. 4A-F. By adaptively using the data channel, frame channel, and timing accuracy relationship for the 8-bit RapidIO system in FIG. 4A-F, or any other system with similar relationships, the parallel communication receiver can adaptively determine the current relationship between the data channel and the frame channel and align the data channel to the frame channel. By performing alignment for all data channels, the receiver is able to synchronize the timing of all data channels and ensure data accuracy.

Figure 5:
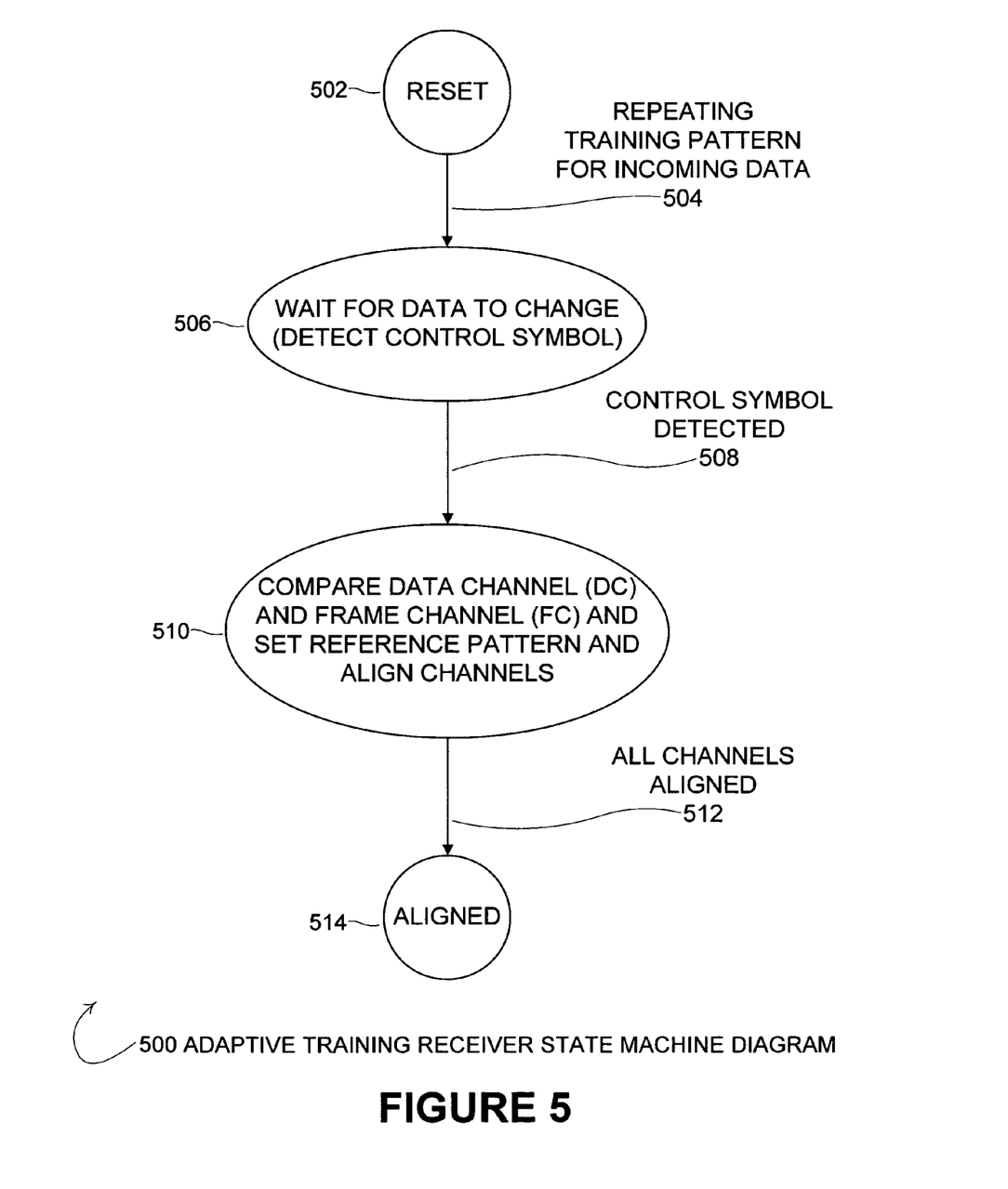
FIG. 5 is a state machine diagram of the operation of an embodiment of an adaptive training for source synchronous parallel receiver.

FIG. 5 is a state machine diagram (500) of the operation of an embodiment of an adaptive training for source synchronous parallel receiver. To start the training process the receiver is put into a 'reset' state (502). To put the receiver into reset (502) typically requires cycling power to the receiver or a user initiated reset action via a hardware button or a software user interface action. Once the receiver is in a reset state (502), the system starts sending repeating packets of training data (504) to the receiver data inputs. The receiver then goes into a 'wait for data' state (506). In the wait for data state (506) the receiver waits to detect a control symbol in the repeating training pattern data (504) before continuing the training process. Once the control symbol is detected (508), the receiver goes into a 'compare and align data' state (510). In the compare and align data state (510) the receiver compares data from each data channel to the data in the frame channel to determine if there is any timing discrepancy between each data channel and the frame channel. Once timing discrepancies are determined, the receiver sets a reference pattern that adjusts the timing for each data channel, thus aligning all data channels for synchronous parallel communication operation. With all channels aligned (512), the receiver switches to an 'aligned' state (514) and normal data reception is begun.

Various embodiments therefore provide the ability for a parallel communication receiver to adaptively adjust the timing of the data channels to align all data channels with the frame channel and achieve a source synchronous signal for all of the parallel data channels. Also, all sections of the frame channel training pattern may be used to train the data channels since possible time shift accuracy error is accounted for between the communication channels and a determination is made as to which section of the frame training pattern is currently being received on the frame channel. Once the section of the frame training section is determined, the parallel receiver adapts the alignment algorithm to match the current frame training pattern being received and appropriately aligns the data channels to the frame channel.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for training parallel digital communications signals in a receiver comprising:

receiving a frame communication signal from a transmitter by said receiver on a frame channel of a parallel communication connection, said transmitter communicating according to a standard communication protocol, said frame communication signal repeating a frame channel training pattern as specified in said standard communication protocol, said frame channel training pattern being substantially a 0×F0 hex pattern (11110000 binary) repeating continuously;

receiving a plurality of data communication signals from said transmitter by said receiver on a plurality of data channels of said parallel communication connection, said data communication signals repeating a data channel training pattern such that a defined training pattern correlation exists between said data channel training pattern and said frame channel training pattern as specified in said standard communication protocol, said plurality of data communication signals and said frame communication signal transmitting in parallel, said data channel training pattern being substantially a 0×F0 hex pattern repeating for a fixed number of repetitions followed by a 0×0F hex pattern (00001111 binary) repeating for said fixed number of repetitions with a totality of said 0×F0 hex and 0×0F hex patterns repeating continuously, each of said received plurality of data communication signals having at most a plus or minus 1 bit error with said received frame communication signal;

comparing, in said receiver, each of said plurality of received data communication signals received by said receiver on said plurality of data channels of said parallel communication connection to said received frame communication signal received by said receiver on said frame channel of said parallel communication connection to obtain a received data signal to frame signal relationship for each of said plurality of data communication signals such that said comparison of said plurality of received data communication signals to said received frame communication signal compares a middle two bits of said four 1's or said four 0's for said frame channel training pattern 0×F0 hex (11110000 binary) of said received frame communication signal to a two bits of each data communication signal of said plurality of data communication signals received at a corresponding time with said frame communication signal in order to obtain said received data signal to frame signal relationship for each of said plurality of data communications signals, said received data signal to frame signal relationship determining whether said data training channel pattern is currently in said 0×F0 hex training pattern or said 0×0F hex training pattern;

determining a time shift difference from said received frame communication signal received by said receiver on said frame channel of said parallel communication connection for each of said plurality of received data communication signals received by said receiver on said plurality of data channels of said parallel communication connection in said receiver based on differences between said received data signal to frame signal relationship and said defined training pattern such that said determination of said time shift difference from said received frame communication signal for each of said plurality of received data communication signals is determined based on said received data signal to frame signal relationship being said 0×F0 hex frame channel training pattern to 0×F0 hex data channel training pattern or said 0×F0 hex frame channel training pattern to 0×0F hex data channel training pattern; and aligning each of said plurality of received data communication signals received by said receiver on said plurality of data channels of said parallel communication connection to said received frame communication signal received by said receiver on said frame channel of said parallel communication connection in said receiver by shifting each of said plurality of received data communication signals to eliminate said time shift difference of each of said plurality of received data communication signals from said received frame communication signal.

2. The method of claim 1 further comprising first performing a reset action in said receiver to indicate a start of training for said plurality of received data communication signals to be aligned to said received frame communication signal and to begin transmittal of said frame channel training pattern and said data channel training pattern.

3. The method of claim 1 further comprising:

ending transmittal of said frame channel training pattern and said data channel training pattern after an indication by said receiver that said plurality of received data communication signals are aligned with said received frame channel communication signal; and receiving real data from said transmitter on said plurality of data communication signals by said receiver.

4. The method of claim 1 wherein said frame channel training pattern and said data channel training pattern contain a control symbol after a specified number of repetitions of a data value.

5. The method of claim 4 further comprising waiting to detect said control symbol to indicate a start to training before comparing said plurality of received data communication signals to said received frame communication signal.

6. The method of claim 1 wherein said standard communication protocol is one of the group comprising: RapidIO, InfiniBand, Advanced Switching Interconnect, and System Packet Interface.

7. A parallel digital communications receiver device comprising:

a frame channel input that receives a frame communication signal from a transmitter on a frame channel of a parallel communication connection, said transmitter communicating according to a standard communication protocol, said frame communication signal repeating a frame channel training pattern as specified in said standard communication protocol, said frame channel training pattern being substantially a 0×F0 hex pattern (11110000 binary) repeating continuously;

a plurality of data channel inputs that receive a corresponding plurality of data communication signals from said transmitter on a plurality of data channels of said parallel communication connection, said data communication signals repeating a data channel training pattern such that a defined training pattern correlation exists between said data channel training pattern and said frame channel training pattern as specified in said standard communication protocol, said plurality of data communication signals and said frame communication signal transmitting in parallel, said data channel training pattern being substantially a 0×F0 hex pattern repeating for a fixed number of repetitions followed by a 0×0F hex pattern (00001111 binary) repeating for said fixed number of repetitions with a totality of said 0×F0 hex and 0×0F hex patterns repeating continuously, each of said received plurality of data signals having at most a plus or minus 1 bit error with said received frame communication signal;

a comparison subsystem that compares each of said plurality of received data communication signals received by said receiver on said plurality of data channels of said parallel communication connection to said received frame communication signal received by said receiver on said frame channel of said parallel communication connection to obtain a received data signal to frame signal relationship for each of said plurality of data communication signals such that said comparison subsystem compares a middle two bits of said four 1's or said four 0's for said frame channel training pattern 0×F0 hex (11110000 binary) of said received frame communication signal to a two bits of each data communication signal of said plurality of data communication signals received at a corresponding time with said frame communication signal in order to obtain said received data signal to frame signal relationship for each of said plurality of data communications signals, said received data signal to frame signal relationship determining whether said data training channel pattern is currently in said 0×F0 hex training pattern or said 0×0F hex training pattern;

a time shift subsystem that determines a time shift difference from said received frame communication signal received by said receiver on said frame channel of said parallel communication connection for each of said plurality of received data communication signals received by said receiver on said plurality of data channels of said parallel communication connection based on differences between said received data signal to frame signal relationship and said defined training pattern correlation such that said time shift subsystem determines said time shift difference from said received frame communication signal for each of said plurality of received data communication signals based on said received data signal to frame signal relationship being said 0×F0 hex frame channel training pattern to 0×F0 hex data channel training pattern or said 0×F0 hex frame channel training pattern to 0×0F hex data channel training pattern; and an alignment subsystem that aligns each of said plurality of received data communication signals received by said receiver on said plurality of data channels of said parallel communication connection to said received frame communication signal received by said receiver on said frame channel of said parallel communication connection by shifting each of said plurality of received data communication signals to eliminate said time shift difference of each of said plurality of received data communication signals from said received frame communication signal.

8. The parallel digital communications receiver device of claim 7 further comprising a reset trigger input, said reset trigger input when triggered indicates that said plurality of received data communication signals need to be aligned to said received frame communication signal and begins transmittal of said frame channel training pattern and said data channel training pattern.

9. The parallel digital communications receiver device of claim 7 further comprising a data acquisition subsystem that ends the transmittal of said frame channel training pattern and said data channel training pattern after said plurality of received data communication signals are aligned with said received frame channel communication signal and receives real data from said transmitter on said plurality of data communication signals.

10. The parallel digital communications receiver device of claim 7 wherein said frame channel training pattern and said data channel training pattern contain a control symbol after a specified number of repetitions of a data value.

11. The parallel digital communications receiver device of claim 10 further comprising a monitor subsystem that waits to detect said control symbol before permitting said comparison subsystem to compare said plurality of received data communication signals to said received frame communication signal.

12. The parallel digital communications receiver device of claim 7 wherein said standard communication protocol is one of the group comprising: RapidIO, InfiniBand, Advanced Switching Interconnect, and System Packet Interface.

13. A parallel digital communications receiver device comprising:

means for receiving a frame communication signal from a transmitter by said receiver on a frame channel of a parallel communication connection, said transmitter communicating according to a standard communication protocol, said frame communication signal repeating a frame channel training pattern as specified in said standard communication protocol, said frame channel training pattern being substantially a 0×F0 hex pattern (11110000 binary) repeating continuously;

means for receiving a plurality of data communication signals from said transmitter by said receiver on a plurality of data channels of said parallel communication connection, said data communication signals repeating a data channel training pattern such that a defined training pattern correlation exists between said data channel training pattern and said frame channel training pattern as specified in said standard communication protocol, said plurality of data communication signals and said frame communication signal transmitting in parallel, said data channel training pattern being substantially a 0×F0 hex pattern repeating for a fixed number of repetitions followed by a 0×0F hex pattern (00001111 binary) repeating for said fixed number of repetitions with a totality of said 0×F0 hex and 0×0F hex pattern repeating continuously, each of said received plurality of data communication signals having at most a plus or minus 1 bit error with said received frame communication signal;

means for comparing, in said receiver, each of said plurality of received data communication signals received by said receiver on said plurality of data channels of said parallel communication connection to said received frame communication signal received by said receiver on said frame channel of said parallel communication connection to obtain a received data signal to frame signal relationship for each of said plurality of data communication signals such that said comparison of said plurality of received data communication signals to said received frame communication signal compares a middle two bits of said four 1's or said four 0's for said frame channel training pattern 0×F0 hex (11110000 binary) of said received frame communication signal to a two bits of each data communication signal of said plurality of data communication signals received at a corresponding time with said frame communication signal in order to obtain said received data signal to frame signal relationship for each of said plurality of data communications signals, said received data signal to frame signal relationship determining whether said data training channel pattern is currently in said 0×F0 hex training pattern or said 0×0F hex training pattern;

means for determining a time shift difference from said received frame communication signal for each of said plurality of received data communication signals received by said receiver on said plurality of data channels of said parallel communication connection in said receiver based on differences between said received data signal to frame signal relationship and said defined training pattern correlation such that said determination of said time shift difference from said received frame communication signal for each of said plurality of received data communication signals is determined based on said received data signal to frame signal relationship being said 0×F0 hex frame channel training pattern to 0×F0 hex data channel training pattern or said 0×F0 hex frame channel training pattern to 0×0F hex data channel training pattern; and means for aligning each of said plurality of received data communication signals received by said receiver on said plurality of data channels of said parallel communication connection to said received frame communication signal received by said receiver on said frame channel of said parallel communication connection in said receiver by shifting each of said plurality of received data communication signals to eliminate said time shift difference of each of said plurality of received data communication signals from said received frame communication signal.

* * * * *